Patented Dec. 16, 1941

2,266,638

UNITED STATES PATENT OFFICE 2,266,638

FLEXIBLE BODY

Ernst A. Hauser, Cambridge, Mass., assignor to Research Corporation, New York, N. Y., a corporation of New York No Drawing. Application February 18, 1939, Serial No. 257,248

14 Claims. (Cl. 106—287)

In my application Serial No. 212,398, filed June 7, 1938, I have described the production of coherent, self-supporting, flexible solid bodies such as films, filaments and the like from natural crystalline inorganic hydrous oxides containing structural water and capable of swelling when brought in contact with water to form plastic hydro-gels and exhibiting base exchange properties such as hydrous aluminum and magnesium silicates, e. g., bentonite. According to said application the material is refined by suspending it in water and centrifuging or settling to separate gritty material, probably consisting principally of quartz, and coarse particles substantially exceeding colloidal size so as to produce a product consisting principally of particles of the substantially pure material of colloidal dimensions. It is further indicated in said application to be desirable to produce a suspension of the smaller particle sizes such as 0.01 to 0.5 micron in which the particles are nearly of the same size, i. e., substantially monodisperse.

I have now found that it is possible to produce coherent, self-supporting, flexible films, filaments and the like from sols and gels of such hydrous oxides which although of colloidal dimensions are not substantially monodisperse. According to my present experience self-supporting films, filaments, etc., can be made from any sol or gel of the specified materials of any polydisperse or monodisperse character so long as the particles are of colloidal dimensions.

The hydrous oxide may be found in the natural state in sufficient purity that no refining is necessary. Such material may be simply suspended in water and used directly. In the case of a magnesium silicate bentonite which is commercially available and contains practically no particles over 1 micron in diameter, it may be suspended in water, allowed to settle for a short time to remove any coarse particles, concentrated to a gel and used. The refining of the hydrous oxide may of course be carried out in any suitable way such as by the use of any suitable suspending liquid other than water or by wind sifting and the refined material then suspended in water to swell the particles and form the gel.

It will be further understood that whether the sol or the gel is used as the film forming material, the gel stage immediately precedes the solid state. If the sol is applied to a surface as a coating, it passes through the gel state to the solid state by drying. The sol is quite dilute and highly fluid and will produce only a relatively thin deposit of solid material. If a small amount of electrolyte is added to a sol, it will form a gel which may be used for the production of films but here again the high dilution of the gel or the low concentration of solids must be considered. If the addition of electrolyte to the sol is carried so far as to cause precipitation or flocculation the resulting suspension is practically useless for the production of films. But a gel produced by concentration and containing a sufficiently high concentration of solids, e. g., 3% or higher or such a gel after slight or incipient flocculation without precipitation by the addition of electrolyte may be used directly for the production of films, filaments and the like. The air dried film, filament or the like, however prepared, generally contains 6–10% of water.

In bentonite, the essential ingredient appears to be the mineral Montmorillonite which generally constitutes 75% or more of bentonites which are found to be suitable for the production of films, filaments and the like.

The present invention is more particularly concerned with the use of the natural crystalline inorganic hydrous oxides capable of forming plastic hydro-gels in combination with other materials for the production of various coherent, self-supporting and flexible articles such as films, coatings, filaments, etc., of the type generally regarded as being obtainable by suitable manipulation of liquid or plastic, i. e., flowable or moldable, compositions consisting of or comprising an ingredient capable of solidifying and of acting as a matrix.

In accordance with my present invention the sol or gel of the hydrous oxide may be mixed with a variety of finely divided water-insoluble solid materials including organic fibrous materials such as paper pulp, jute, silk, cotton synthetic fibers, etc., inorganic fibrous materials such as asbestos, rock wool, glass wool, etc., powdered or flake materials such as ground mica, metal flakes or powders, e. g., aluminum and copper powders, dyes and pigments such as titanium dioxide, lithopone, carbon black, etc., and with water emulsions of plastic water-insoluble materials such as asphaltum, nitrocellulose and waxes. In certain instances the hydrous oxide itself may serve as the emulsifying agent, as, for example in the case of asphalt and waxes. Fibrous materials either individually dispersed or in the form of a more or less loosely matted fabric generally serve to strengthen the films, filaments, etc., especially with respect to tear resistance whereas pigments, dyes and fillers may reinforce the films or filaments or may serve only to provide color or body.

A wide range of proportions of the added material up to an amount equal to the weight of the air dry hydrous oxide may be used. The fibrous and powdered materials disperse readily in the sol or gel and the resulting composition readily may be sprayed, spread, extruded or molded into the desired shapes.

Instead of mixing the sol or gel with the fibrous or powdered material, the latter may be applied to, e. g., sprinkled on to the surface of a wet film or the like of the gel before it has dried. This is particularly of interest with respect to metal powders or flakes. Useful products may be made by painting the films and also by coating the film by the application of a vaporized metal, e. g., by sputtering a metal such as aluminum.

As stated the gel may be mixed with a suspension of the finely divided material which may be an emulsion of a plastic material such as asphaltum, nitrocellulose, various waxes and resins such as vinyl resins, cellulose acetate and the like and the resulting composition may be used for coating, the production of films, filaments, and the like, molding, etc.

Strongly adherent protective coatings on metals and other surfaces may be produced.

The sol or gel of the inorganic colloid may also be applied to fibrous structures such as yarns or fabrics which it will impregnate and coat thereby producing useful products. They may be either immersed, in which case they are saturated with the gel, or coatings of the gel may be applied to one or both sides. Besides fabrics, felts and the like may be similarly treated.

The films, filaments, etc., may be treated in various ways as by drying, heating, pressing, and with chemical agents and combinations thereof to improve or modify their properties such as improving their resistance to water, their appearance, their tear and fold resistance, etc.

*Examples*

1. 10 parts by weight of well beaten 5% paper pulp were mixed with 100 parts by weight of a 10% bentonite gel and the resulting composition spread to a film and dried. Depending upon the amount of composition applied to the supporting surface sheets corresponding in thickness to from thin paper to heavy cardboard may be prepared. All such sheets are self-supporting flexible and strong, the strength and flexibility depending of course upon the thickness.

Similarly films were prepared from the following mixtures.

2. 100 parts by weight of 10% bentonite gel mixed with 5 parts by weight of a 25% aqueous wax emulsion. The film is white, translucent and has a waxy appearance.

3. 100 parts by weight of 10% bentonite gel mixed with 2 parts by weight of asphalt. (The asphalt was simply melted and stirred into the bentonite gel, the latter serving as the emulsifying vehicle.) The film is black, has a waxy appearing top surface and the surface formed in contact with the support is highly reflecting.

4. 100 parts by weight of 10% bentonite gel mixed with 10 parts by weight of a 20% aqueous asphalt emulsion.

5. 100 parts by weight of 10% bentonite gel mixed with about 12 parts by weight of a 40% aqueous rosin emulsion.

6. 100 parts by weight of 10% bentonite gel mixed with 10 parts by weight of a 15% aqueous nitrocellulose emulsion. The film is uniform in texture and tougher and more crease resistant than a film formed of bentonite gel alone.

7. 100 parts by weight of 10% bentonite gel mixed with 2 parts by weight of aluminum powder. The film looks like aluminum foil and the aluminum powder appears to be evenly dispersed.

8. 100 parts by weight of 10% bentonite gel mixed with 2 parts by weight of copper powder. The film looks like copper foil.

9. 100 parts by weight of 10% bentonite gel mixed with 4 parts by weight of ground mica flake.

10. 100 parts by weight of 10% bentonite gel mixed with 4 parts by weight of well beaten 10% asbestos pulp (in water). The film looks like asbestos paper but is smoother.

11. 100 parts by weight of 10% bentonite gel mixed with 4 parts by weight of finely divided rock wool. The film is similar to that of Example 10.

12. 100 parts by weight of 10% bentonite gel mixed with 2 parts by weight of titanium oxide pigment. The top surface of the film looks like a high grade bond paper. The surface formed in contact with the smooth support is smooth, and reflecting.

13. 100 parts by weight of 10% bentonite gel mixed with 5 parts by weight of lithopone.

14. 100 parts by weight of 10% bentonite gel mixed with 5 parts by weight of carbon black. The film is black and somewhat tougher than a pure bentonite film.

It will be apparent that in the foregoing examples the concentration of the bentonite gel may be varied and that the proportion of the bentonite gel to the added material may be varied within rather wide limits. For example the concentration of the gel may vary from about 5 to about 14% of the hydrous oxide and the amount of filler added to the gel may vary from about 2 to about 10% respectively. These figures are not maximum and minimum limits but merely represent satisfactory ranges of variation.

The product of each example is a continuous coherent self-supporting solid body or film. The films vary in color, texture and other properties depending upon the character of the added material. In all of the structures the added material will be found to be evenly distributed and embedded in the structure formed by the bentonite gel. Special structures may be made by applying the added powdered or fibrous material to the surface of a freshly formed and still wet and plastic layer of the bentonite gel. In this case the added material apparently penetrates to some extent into the surface of the gel and is bonded to the surface thereof and is tenaciously held to the resulting film after drying. In the case of a film produced in this manner by sprinkling the freshly formed wet gel film with aluminum powder, the metal appears to be practically continuous and has the appearance of aluminum foil.

Useful films may be made by electrical sputtering of metals such as aluminum onto the hydrous oxide film after it has dried and set.

By the term "self-supporting" in the description of the coherent, self-supporting, flexible solid bodies I mean bodies which in the absence of any physical support and in sizes of say up to 1 foot maximum dimension, are capable of being handled, e. g. picked up between thumb and finger without tearing or breaking.

I claim:
1. A flexible, coherent, self-supporting solid body comprising an inert water-insoluble finely divided material incorporated into a coherent and self-supporting flexible matrix of a natural crystalline inorganic hydrous oxide containing structural water and capable of swelling when brought in contact with water to form a plastic hydro-gel and exhibiting base exchange properties, the weight of hydrous oxide being at least equal to the weight of the finely divided material.

2. A flexible, coherent, self-supporting solid body as defined in claim 1 in which the hydrous oxide is Montmorillonite.

3. A flexible, coherent, self-supporting solid body as defined in claim 1 in which the hydrous oxide is a member of the group consisting of aluminum silicates, magnesium silicates and magnesium aluminum silicates.

4. A flexible, coherent, self-supporting solid body comprising a finely divided fibrous material in a matrix formed by drying a colloidal suspension of a natural crystalline inorganic hydrous oxide containing structural water and capable of swelling when brought in contact with water to form a plastic hydro-gel and exhibiting base exchange properties, the weight of the hydrous oxide being at least equal to the weight of the finely divided material.

5. Solid body as defined in claim 1 in which the inert finely divided material is an organic fibrous material.

6. Solid body as defined in claim 1 in which the inert finely divided material is an inorganic fibrous material.

7. Solid body as defined in claim 1 in which the inert finely divided material is a metal powder.

8. A flexible, coherent, self-supporting solid body formed of a mixture of a colloidal suspension of a natural crystalline inorganic hydrous oxide containing structural water and capable of swelling when brought in contact with water to form a plastic hydro-gel and exhibiting base exchange properties and an emulsion of an organic material, said solid body comprising finely divided particles of the organic material dispersed in a matrix of the hydrous oxide and the weight of hydrous oxide being at least equal to the weight of organic material.

9. Solid body as defined in claim 1 in which the finely divided material is a pigment.

10. Solid body as defined in claim 1 in which the finely divided material is a dye.

11. Solid body as defined in claim 1 in which the finely divided solid material is in the form of flakes.

12. Solid body as defined in claim 1 in the form of a film.

13. Solid body as defined in claim 4 in the form of a film.

14. A flexible, coherent, self-supporting solid body as defined in claim 1 in which the inert, water-insoluble, finely divided material is a fibrous material in the form of a fabric.

ERNST A. HAUSER.